United States Patent [19]

Röhm

[11] 4,395,171

[45] Jul. 26, 1983

[54] CHUCK KEY

[76] Inventor: Günter H. Röhm, Heinrich-Röhm-Str. 50, 7297 Sontheim, Fed. Rep. of Germany

[21] Appl. No.: 232,174

[22] Filed: Feb. 6, 1981

[30] Foreign Application Priority Data

Feb. 8, 1980 [DE] Fed. Rep. of Germany ....... 3004644

[51] Int. Cl.$^3$ .......... B23B 31/06

[52] U.S. Cl. .......... 408/241 R; 81/90 A; 279/1 K

[58] Field of Search .......... 408/241 R; 279/1 K; 81/90 A

[56] References Cited

U.S. PATENT DOCUMENTS

| | | | |
|---|---|---|---|
| 2,442,717 | 6/1948 | Willette | 408/241 R X |
| 2,618,995 | 11/1952 | Droege | 81/90 A |
| 2,690,690 | 10/1954 | Garton | 81/90 A |
| 3,457,813 | 7/1969 | Mangas | 408/241 R X |
| 4,111,079 | 9/1978 | Derbyshire | 279/1 K X |

FOREIGN PATENT DOCUMENTS

| | | | |
|---|---|---|---|
| 2381444 | 10/1978 | France | 81/90 A |

*Primary Examiner*—William R. Briggs
*Attorney, Agent, or Firm*—Karl F. Ross; Herbert Dubno

[57] ABSTRACT

A chuck key as a tubular body extending along an axis and having an axially forwardly directed end formed with an array of teeth centered on the axis. A crosspiece extends diametrically through the body at the end opposite its toothed end. A pin is displaceable axially in the bore of the body between a front position projecting axially forwardly from the body beyond the teeth and in a rear position withdrawn axially backwardly in the body. A spring braced between the pin and the body urges the pin into the front position. An operating member is movable radially relative to the body and has an outer end that projects radially from the body. Interengaging formations on this member and on the pin displace the pin against the force of the spring from the rear to front position on depression of the end of the member radially inwardly. Thus the thumb of the hand grasping the crosspiece can push in the operating member to extend the pin for fitting of the key to a chuck. When the operating member is released the pin automatically retracts to ensure that the key disengages from the chuck.

9 Claims, 3 Drawing Figures

CHUCK KEY

FIELD OF THE INVENTION

The present invention relates to a chuck key. More particularly this invention concerns a hand key of the type used to tighten a drill chuck or the like.

BACKGROUND OF THE INVENTION

A drill chuck normally has a chuck body surrounded by a sleeve that can be rotated relative to the chuck body in one direction to move the jaws of the chuck radially toward one another and in the opposite direction to move the jaws apart. In order to be able to apply quite some torque to this sleeve it is standard practice to form this sleeve at one end with an array of axially directed teeth and to form the chuck body adjacent these teeth with one or more pilot holes. A chuck key has a key body having a front end from which extends a pilot pin insertable into any of these pilot holes. This front end of the key body is formed with an array of teeth surrounding the pilot pin so that when the pilot pin is inserted in a pilot hole the teeth of the key mesh with the teeth of the sleeve of the chuck. A crosspiece is provided on the rear end of the chuck body so that the user can then rotate the key and exert considerable force between the chuck body and the sleeve.

A fairly common and relatively dangerous accident can occur when the chuck key is left inserted in the chuck. As the drill is started up the key will be thrown radially outwardly, potentially seriously injuring the user of the tool or a bystander.

Accordingly it has been suggested, as for example in U.S. Pat. No. 4,111,079, to provide means which insure automatic disengagement of the chuck key from the chuck when it is released by the user. In the simplest form the key is provided with a backwardly resiliently deflectable arm or spring element that is pushed backward, with concomitant elastic deformation, when the pilot pin is inserted in the hole in the chuck, but which is sufficiently springy to push the pilot pin out of the pilot hole when no axial forward force is exerted by the user on the key relative to the chuck.

It is also known to make the pilot pin axially displaceable in the chuck body. A spring urges this pin into an inner position in which it is retracted back into the chuck body. The cross-piece that is held by the user chuck is connected to the pin so that the pin can be pushed forwardly relative to the sleeve-shaped key body surrounding it. Thus the user must push the crosspiece and pin linked to it axially forwardly relative to the key body in order to extend the pilot pin.

The disadvantage of this system is that fitting of the pilot pin into the pilot hole is a relatively difficult job. The key body is placed against the chuck with its teeth meshed with those of the chuck and the pilot pin aligned with the pilot hole, whereupon the crosspiece is pressed axially forwardly to extend the pilot pin into the pilot hole. If the pilot pin and pilot hole is not perfectly aligned the chuck key must be maneuvered around to aligned the two and fit them together. Furthermore during rotation of the chuck key it is necessary to continue the axially forwardly directed force on the crosspiece in order to insure that the pilot pin remains projecting axially forwardly out of the chuck key.

OBJECTS OF THE INVENTION

It is therefore an object of the present invention to provide an improved chuck key.

Another object is to provide a chuck key which automatically disengages itself from the chuck when released by the user.

Another object is to provide such an automatically disengaging chuck key which overcomes the above-given disadvantages of this type of key.

SUMMARY OF THE INVENTION

These objects are attained according to the instant invention in a chuck key of the above-described auto-disengage type, but wherein an operating member is movable radially relative to the body and has an outer end that projects radially from the body in an outer position thereof. Means including a pair of interengaging formations are provided on this member and on an axially displaceable pilot pin in the bore of the chuck body for displacing the pin against the force of the biasing spring from the rear retracted position to the front projecting position on depression of the one end of the member radially inwardly from the outer position. According to this invention this member is movable transversely of the axis of the chuck body and of the axis of the crosspiece.

The advantage of the system according to the instant invention is that it is possible for the user to make the pilot pin project from the end of the chuck key even before fitting the chuck key to the chuck. Thus the operating member is depressed so as to push out the pilot pin which can then be fitted into the pilot hole for easiest possible fitting of the chuck key to the chuck.

According to further feature of this invention the operating member is constituted as a rod extending diametrically through the key axis and having two outer ends either of which can be depressed to move the pin into the extended position. This operating-member rod extends perpendicular to the axis of the key and is offset by 90° from the crosspiece which is normally constituted as a pin or rod also extending perpendicularly and diametrially through the axis of the key. Thus as the user of the key grasps the key in the normal manner with his fingers wrapped around the crosspiece it will be a natural and easy operation to press in the operating member with the thumb. This will work equally well for right-handed and left-handed people.

According to further features of this invention the rod constituting the operating member is formed on its longitudinal side turned forwardly toward the pin with a V-shaped notch. The pin has a rearwardly directed head of similar V-shaped that is complementary to this notch. Thus when displaced in one diametrial direction the rod will cam the pin forwardly with one face of its notch, and when displaced in the opposite direction will cam it forwardly with its opposite face. The spring urging the pin into the back position will automatically also therefore center the operating member when no external force is applied to it due to the interaction of these cam formations.

The opposite or back longitudinal side of the operating member is formed with an elongated groove. The central portion of the crosspiece engages in this groove so as to retain the operating member in place. In its end position the respective ends of the operating member will engage the crosspiece. Such an arrangement therefore insures that the whole system can be manufactured in a relatively simple matter, with the crosspiece serving to retain the operating member which in turn holds the pin and spring in place.

SPECIFIC DESCRIPTION

Figure 1:
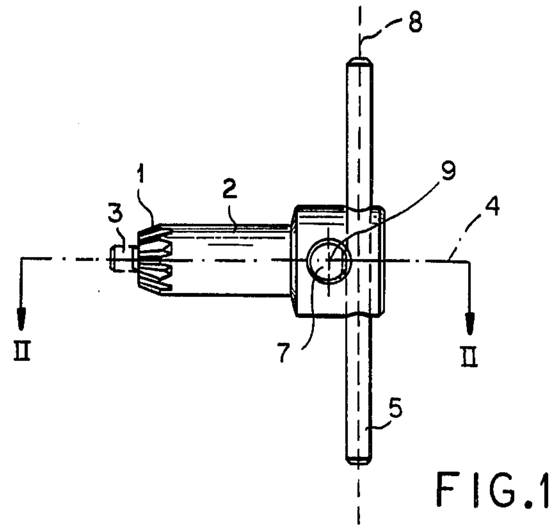
FIG. 1 is a side view of the chuck key according to this invention.
Figure 2:
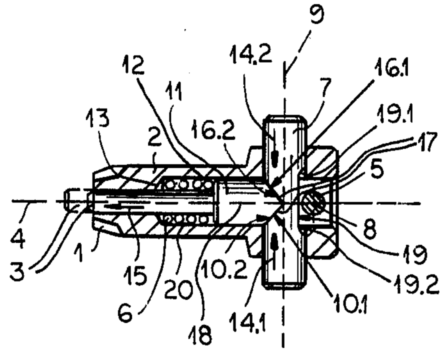
FIG. 2 is an axial section taken along the line II—II of FIG. 1 with the key, once again, in the unactuated position.

As seen in FIGS. 1 and 2 a chuck key according to the instant invention has a key body 2 of generally tubular shape centered on an axis 4. This body 2 has a front end 1 formed in conventional manner with teeth 1. Axially slidable within this tubular chuck body 2 is a pilot pin 3 having a front end which can move in a direction 15 from the solid line position of FIGS. 1 and 2 to the dashed line position of FIGS. 1 and 2 and the solid-line position of FIG. 3. This pin 3 has a rear end formed with a head 11 and a compression spring 6 is braced between the front face 12 of this end 11 and a rear face 13 of the stepped bore 20 of the body 2.

Extending through the thicker rear portion of the key body 2 is a standard crosspiece rod 5 centered on an axis 8 perpendicular to and intersecting the axis 4. The crosspiece 5 is normally gripped by the user of the key, with two fingers on one side and two on the other of the chuck body 2.

Figure 3:
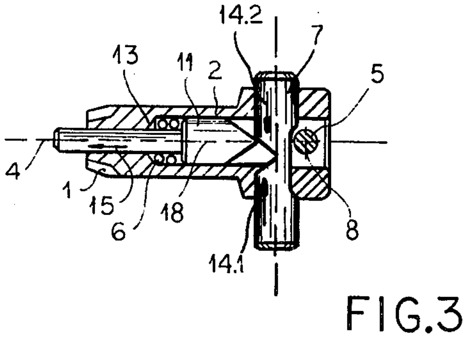
FIG. 3 is a sectional view similar to FIG. 2 but showing the key in the actuated position with its pilot pin extended forwardly.

Between the crosspiece 5 and the pin 3 is an operating member 7 here constituted as a cylindrical rod formed with a V-shaped notch 17 having planar flanks 10.2 and 16.2 which lie at an angle of 90° to each other. Complementarily the head 11 of the pin 3 has an end 18 formed of similar V-shape and having flanks 10.1 and 16.1 that can flatly engage the respective flanks of the notches 17. The opposite longitudinal side or edge of the operating member or rod 7 is formed with an elongated groove 19 having ends 19.1 and 19.2 that engage the crosspiece rod 5 in end positions of this operating member 7 such as illustrated in FIG. 3.

In order to fit the key according to the instant invention to a chuck the user grasps it in the normal manner with his or her fingers around the crosspiece rod 5 and depresses either end of the operating member 7 which is convenient, using the thumb of the same hand whose fingers are grasping the crosspiece rod 5. This action, for instance, forces the operating member 7 in the direction of arrow 14.2 in FIG. 2 so that the surface 16.2 will press on the surface 16.1 and cam the pin 3 forwardly into the position shown in FIG. 3. The notch 17 does not move completely across the tip of the end 18 so that in this position the compressed spring 6 will still seek to return the operating member 7 in direction 14.1 opposite to the direction 14.2. As soon as the operating member 7 is released the pin 3 will slide back into the chuck body 2, causing it to fall off the chuck if it is not held in place.

Thus with the system according to the instant invention the key will automatically disengage itself from the chuck when released by the operator. Nonetheless it is a relatively easy matter to extend the pilot pin 3 for use of the chuck key in the normal and convenient manner. Holding in either end of the operating member 7 in no way makes it harder to grip the chuck key according to this invention.

I claim:

1. A chuck key comprising:

a body extending along an axis and having an axially forwardly directed end formed with an array of teeth centered on said axis, said body being formed with a bore opening axially forwardly at said forward end;

a crosspiece extending generally radially from said body and fixed thereon remote from said forward end;

a pin displaceable axially in said bore of said body between a front position projecting axially forwardly from said body beyond said teeth and a rear position withdrawn axially backwardly in said body;

a spring braced between said pin and said body and urging said pin into said rear position;

an operating member mounted to be movable radially relative to said body and having an outer end projecting radially from said body; and means including a pair of interengaging formations on said member and on said pin for displacing said pin against the force of said spring from said rear to said front position on depression of said one end of said member radially inwardly.

2. The key defined in claim 1 wherein said operating member is mounted to be movable transversely of said axis and of said crosspiece.

3. The key defined in claim 2 wherein said pair of formations includes one formation on said member and another formation on said pin, both of said formations being flat and inclined to said axis.

4. The key defined in claim 3 wherein said member is a diametrally extending rod having two such outer ends and two such one formations, said pin having two such other formations.

5. The key defined in claim 4 wherein said rod is formed with a V-shaped notch having a pair of flanks forming said faces of said one formations.

6. The key defined in claim 5 wherein said pin has a V-shaped rear end having a pair of flanks forming said faces of said other formations.

7. The key defined in claim 4 wherein said crosspiece is substantially perpendicular to said member and said member is between said crosspiece and said pin, said member having a side turned toward said crosspiece and formed with an elongated groove having a pair of ends, said crosspiece being spaced from both of said ends in the undepressed conditions of said member.

8. The key defined in claim 4 wherein both outer ends of said member extend substantially the same distance from said body in the undepressed position of said member.

9. The key defined in claim 2 wherein said crosspiece has a crosspiece axis intersecting and perpendicular to said axis of said body and said member has a member axis intersecting and perpendicular to said axis of said body, said member and crosspiece axes being offset by about 90° to each other about the axis of said body.

* * * * *